(12) United States Patent
Pummer et al.

(10) Patent No.: US 7,676,196 B2
(45) Date of Patent: Mar. 9, 2010

(54) TELECOMMUNICATION SYSTEMS FOR PROVIDING CELLULAR SERVICE TO RF SHADOWS

(75) Inventors: Alexander C. Pummer, Pleasanton, CA (US); John E. Powers, Fremont, CA (US)

(73) Assignee: Mosaic Technology Group Corporation, Fremont, CA (US)

( * ) Notice: Subject to any disclaimer, the term of this patent is extended or adjusted under 35 U.S.C. 154(b) by 1206 days.

(21) Appl. No.: 10/736,483

(22) Filed: Dec. 15, 2003

(65) Prior Publication Data

US 2005/0130607 A1 Jun. 16, 2005

(51) Int. Cl.
*H04B 7/14* (2006.01)
(52) U.S. Cl. .................... 455/16; 455/115.1; 455/66.1; 455/562.1
(58) Field of Classification Search .................... 455/15, 455/20, 11.1, 24, 562.1, 63.2, 13.4, 522, 455/561, 95, 9, 16, 17, 19, 23, 63.4, 504, 455/506, 66.1, 67.11, 277.1, 115.1, 25; 370/279, 370/315
See application file for complete search history.

(56) References Cited

U.S. PATENT DOCUMENTS

| | | | | |
|---|---|---|---|---|
| 4,849,963 A | * | 7/1989 | Kawano et al. | 455/15 |
| 5,659,879 A | * | 8/1997 | Dupuy | 455/15 |
| 6,549,529 B1 | * | 4/2003 | Drabeck et al. | 370/347 |
| 6,745,003 B1 | * | 6/2004 | Maca et al. | 455/11.1 |
| 6,889,033 B2 | * | 5/2005 | Bongfeldt | 455/11.1 |
| 2003/0050099 A1 | * | 3/2003 | Izadpanah | 455/562 |

\* cited by examiner

*Primary Examiner*—John Lee

(57) ABSTRACT

A telecommunications system provides service to a cellular device located within a radio-frequency (RF) shadow of a communication station. The system may include a line-of-sight (LOS) antenna located in a line of sight of the station and a shadow antenna in communication with the LOS antenna and located within a line of sight of the RF shadow. The LOS antenna receives a transmitter signal from the station, and the shadow antenna receives a cellular signal from the cellular device. The LOS antenna also receives the cellular signal from the shadow antenna and, in turn, transmits the cellular signal to the station. Similarly, the shadow antenna receives the transmitter signal from the LOS antenna and, in turn, transmits the transmitter signal to the RF shadow. Accordingly, the cellular device is able to receive the transmitter signal T, and the station is able to receive the cellular signal. The telecommunication system may include a plurality of shadow antennas each for receiving the transmitter signal from the LOS antenna and for transmitting the transmitter signal to the RF shadow along a respective and unique transmission axis.

2 Claims, 6 Drawing Sheets

TELECOMMUNICATION SYSTEMS FOR PROVIDING CELLULAR SERVICE TO RF SHADOWS

BACKGROUND OF THE INVENTION

1. Field of the Invention

The present invention relates to telecommunication systems, particularly to devices for enhancing signal strength in areas that do not received direct line-of-sight transmissions.

2. Description of the Related Art

Cellular devices communicate with electromagnetic waves that utilize radio frequencies (RF). In a communication system, waves are transmitted by a transmitter and received by a receiver. For optimal efficiency, a direct line of sight should exist between the transmitter and the receiver; that is, the receiver should be in the area that is "illuminated" by the transmitter so that the strength of the received signal is maximized.

One of the properties of electromagnetic waves is that as the wavelength gets shorter, the waves propagate similarly to light. Therefore, areas that are not illuminated by a transmitter are in what is known as an RF shadow. If a cellular customer is located within an RF shadow, the strength of the received signal is greatly deteriorated; thus, high-quality reception cannot be expected.

Low signal strength may be mitigated to a certain extent by reflection. If a receiver (i.e., a cellular phone) is within an RF shadow that is physically close to a transmitter, the propagated wave from the transmitter will reflect off of surrounding or ambient objects (e.g., buildings) back to the cellular phone. This is known as local reflection. However, because of the physical characteristics of such ambient objects, the reflected signal will not have the same quality of a directly received line-of-sight signal.

The line-of-sight propagation of cellular communications is particularly obvious in mountainous areas, especially in areas distant from the transmitter where the local reflection does not provide usable signal strength. Other areas where RF shadows are present include urban areas with high-rise buildings, building interiors, and underground facilities.

BRIEF SUMMARY OF THE INVENTION

According to one aspect of the invention, a telecommunications system provides service to a cellular device located within a radio-frequency (RF) shadow of a communication station. The system may include a line-of-sight (LOS) antenna located in a line of sight of the station and a shadow antenna in communication with the LOS antenna and located within a line of sight of the RF shadow. The LOS antenna receives a transmitter signal from the station, and the shadow antenna receives a cellular signal from the cellular device. The LOS antenna also receives the cellular signal from the shadow antenna and, in turn, transmits the cellular signal to the station. Similarly, the shadow antenna receives the transmitter signal from the LOS antenna and, in turn, transmits the transmitter signal to the RF shadow. Accordingly, the cellular device is able to receive the transmitter signal T, and the station is able to receive the cellular signal.

According to another aspect of the invention, the telecommunication system may include a plurality of shadow antennas each for receiving the transmitter signal from the LOS antenna and for transmitting the transmitter signal to the RF shadow along a respective and unique transmission axis. According to this embodiment, multiple areas of the RF shadow may be provided with the transmitter signal to maximize the cellular coverage of the RF shadow.

Other objects, features, and advantages of the present invention will become apparent to those skilled in the art from a consideration of the following detailed description taken in conjunction with the accompanying drawings.

DETAILED DESCRIPTION OF THE INVENTION

Figure 1:
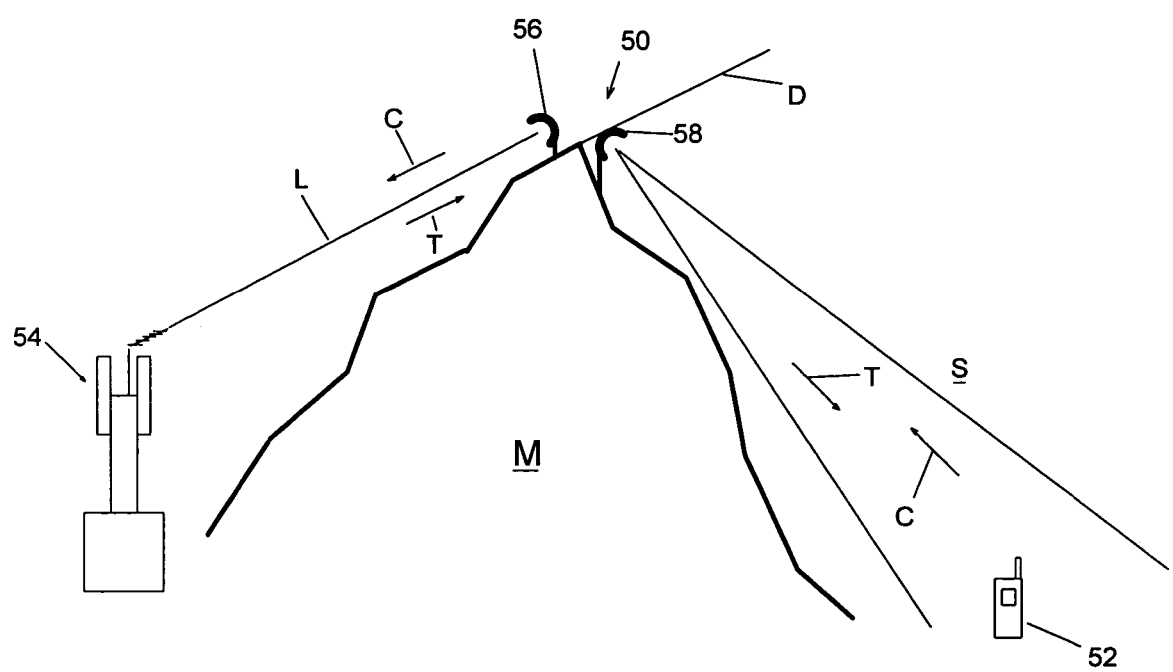
FIG. 1 schematically illustrates a telecommunication system for providing cellular service to an RF shadow of a communication station.

Referring particularly to FIG. 1 of the drawings, a telecommunications system 50 provides service to a cellular device 52 located within a radio-frequency (RF) shadow of a communication station 54. The station 54 may be configured as known in the art, including, for example, an antenna, a transmitter, and a receiver. For the purposes of this description, the RF shadow is represented as an area S below dashed line D and blocked from the station 54 by mountain M. In commercial installations, the RF shadow is any area that is not located within the line of sight of the station 54. For the purposes of this description, the telecommunication system 50 may be configured to transmit wirelessly any type of information, including voice, video, data, and so on.

Figure 2:
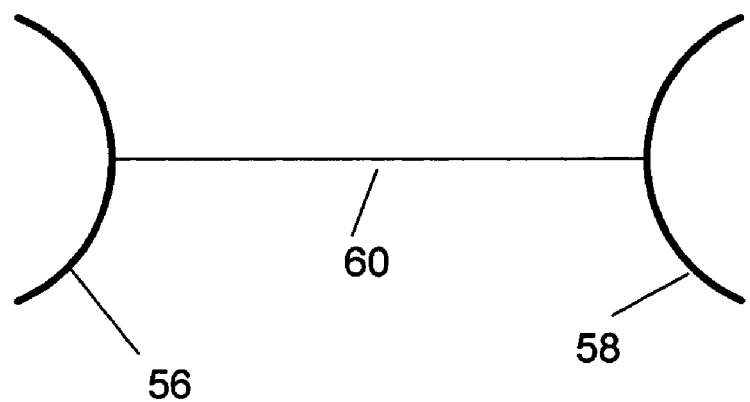
FIG. 2 is a schematic view of the system according to some of the embodiments.

In a number of embodiments, the system 50 may include an antenna 56 located in a line of sight (indicated by L) of the station 54 and an antenna 58 located within a line of sight of the RF shadow. Accordingly, for the purposes of this description, antenna 56 will be referred to as the line-of-sight (LOS) antenna, and antenna 58 will be referred to as the shadow antenna. As shown in FIG. 2, the LOS antenna 56 and the shadow antenna 58 are in communication with each other, for example, by a high-frequency interconnection or link 60. In many embodiments, the interconnection 60 may include a cable.

The LOS antenna 56 receives a transmitter signal T from the station 54, and the shadow antenna 58 receives a cellular signal C from the cellular device 52. The LOS antenna 56 also receives the cellular signal C from the shadow antenna 58 and, in turn, transmits the cellular signal C to the station 54. Similarly, the shadow antenna 58 receives the transmitter signal T from the LOS antenna 56 and, in turn, transmits the transmitter signal T to the RF shadow. Accordingly, the cellular device 52 is able to receive the transmitter signal T which otherwise would not be able to be received in the RF shadow, and the station is able to receive the cellular Signal C which otherwise would not be able to be received from the RF shadow.

Figure 3:
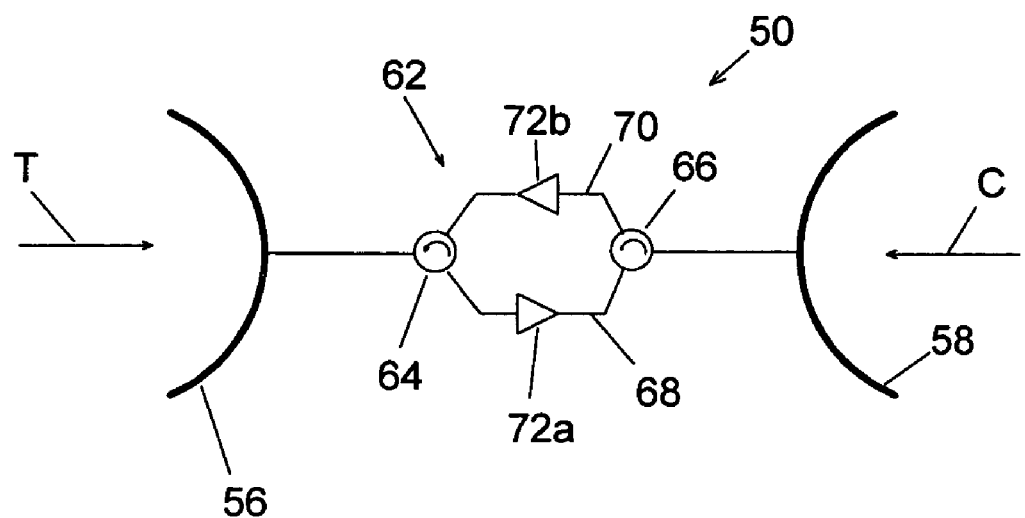
FIG. 3 is a schematic view of the system in other embodiments including an amplifier section.

Referencing FIG. 3, in a number of embodiments the system 50 may include an amplification section 62 disposed between the antennas 56 and 58 for amplifying the transmitter signal T and the cellular signal C. In some of the embodiments, the amplification section 62 may include an LOS circulator 64 and a shadow circulator 66. The circulators 64 and 66 may define between the antennas 56 and 58 an LOS-to-shadow path 68 and a shadow-to-LOS path 70. The circulators 64 and 66 may be configured to decouple the transmitted signal T and the cellular signal C at an interface with the antennas 56 and 58.

More specifically, the LOS circulator 64 may be configured to receive the transmitter signal T from the LOS antenna 56 and provide the transmitter signal to the LOS-to-shadow path. Similarly, the shadow circulator 66 may be configured to receive the cellular signal C from the shadow antenna 58 and provide the cellular signal C to the shadow-to-LOS path 70. In addition, the LOS circulator 64 may receive the cellular signal C from the shadow-to-LOS path 70 and provide the cellular signal C to the LOS antenna 56. Analogously, the shadow circulator 66 may then receive the transmitter signal T from the LOS-to-shadow path 68 and provide the transmitter signal T to the shadow antenna 58.

For amplification, the amplification section 62 may include a pair of amplifiers 72. A first amplifier 72a may be disposed in the LOS-to-shadow path 68 for amplifying the transmitter signal T, and a second amplifier 72b may be disposed in the shadow-to-LOS path 70 for amplifying the cellular signal C. Accordingly, the amplification section 62 may be configured to independently amplify each of the signals T and C between the antennas 56 and 58.

Figure 4:
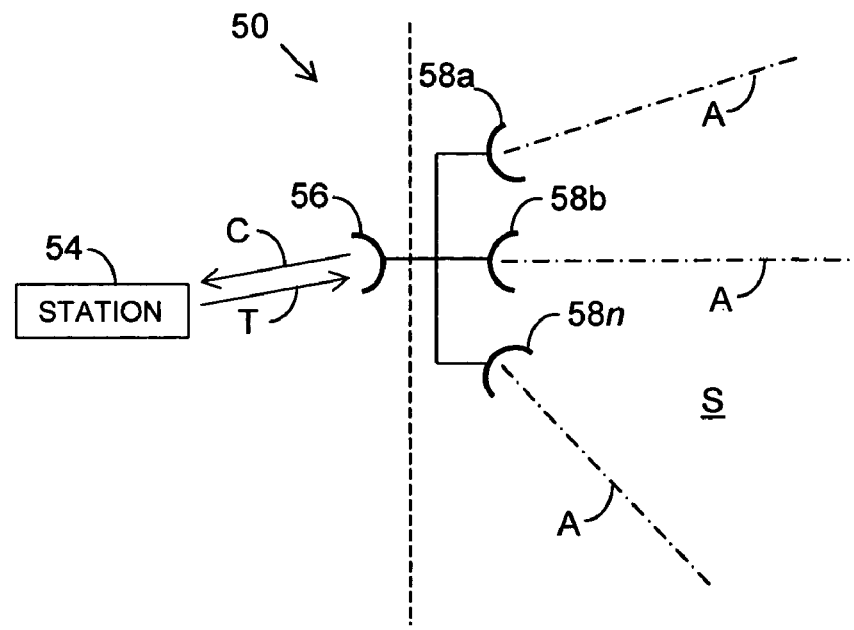
FIG. 4 schematically illustrates a telecommunication system with a plurality of antennas for providing cellular service to an RF shadow.

With reference to FIG. 4, in a number of embodiments, the communication system 50 may include a plurality of shadow antennas 58a, 58b, . . . , 58n each for receiving the transmitter signal from the LOS antenna 56 and for transmitting the transmitter signal T to the RF shadow S along a respective and unique transmission axis A. Accordingly, multiple areas of the RF shadow may be provided with the transmitter signal T to maximize the cellular coverage of the RF shadow.

Figure 5:
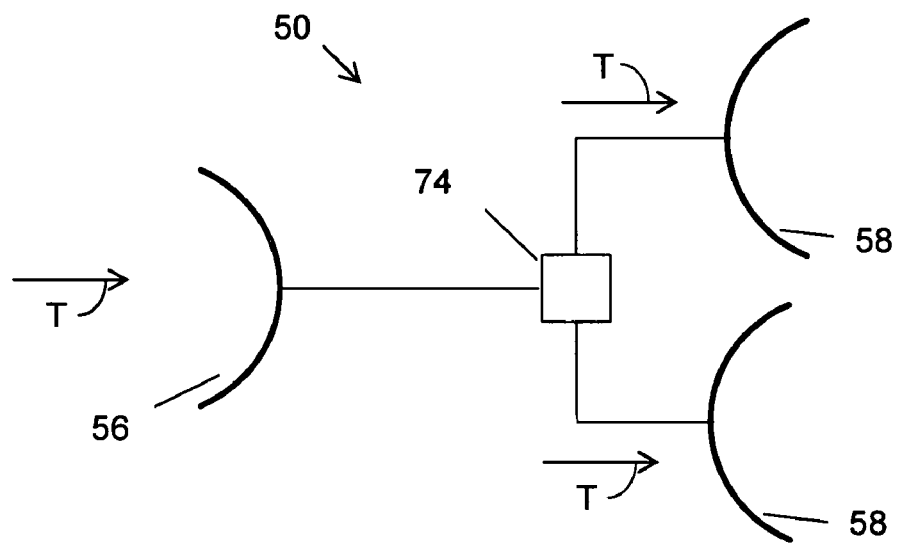
FIG. 5 is a schematic view of the system according to a number of embodiments with a splitter.

As shown in FIG. 5, in a number of embodiments the system 50 may include a splitter 74 disposed between the LOS antenna 56 and each of the plurality of shadow antennas 58. The splitter 74 may be configured to split the transmitter signal T into a corresponding plurality of transmitter signals T respectively communicated to the shadow antennas 58.

Figure 6:
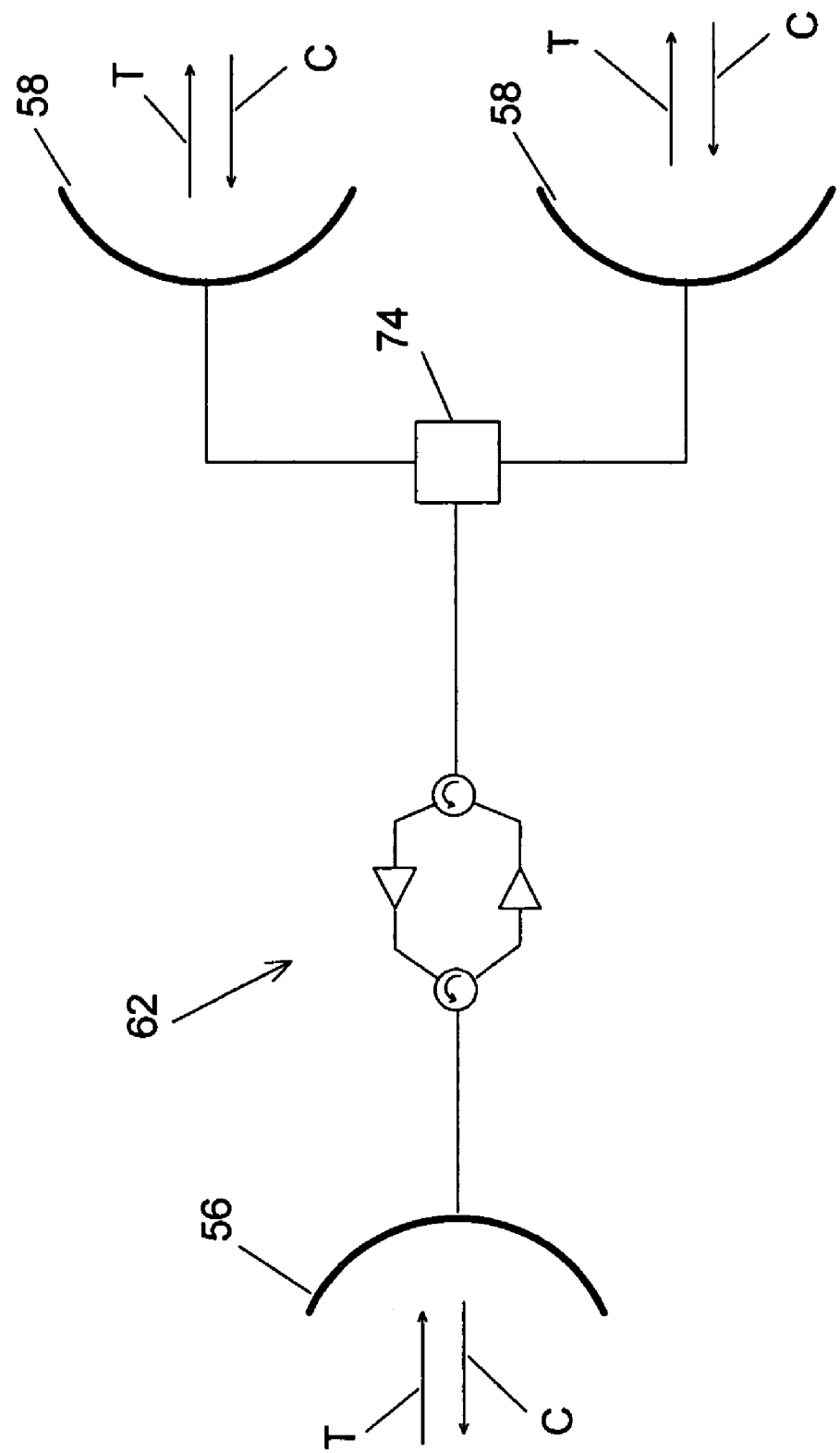
FIG. 6 is a schematic view of the system in embodiments with a splitter and an amplifier section.
Figure 7:
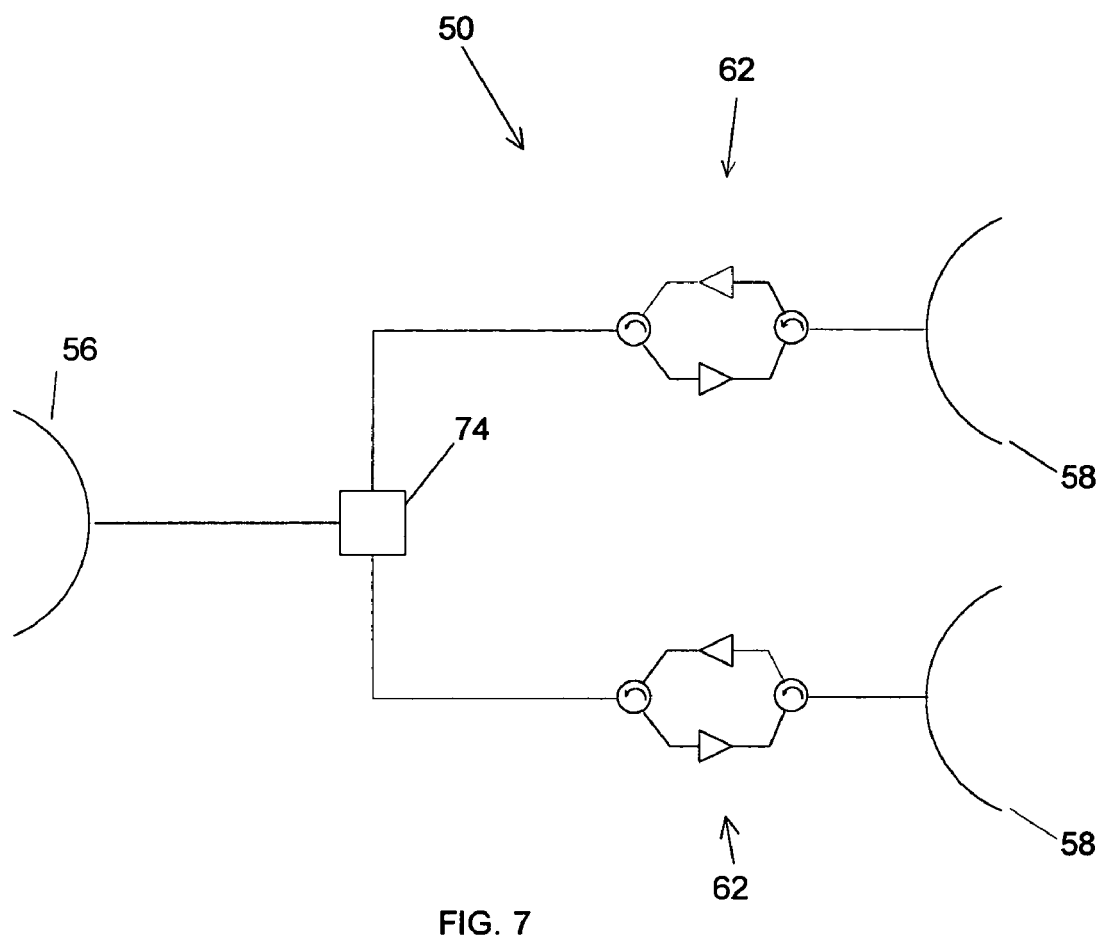
FIG. 7 is a schematic view of the system in embodiments with a splitter and a plurality of amplifier sections.

In a number of embodiments, one or more amplification sections 62 each analogous to that described above may be provided for amplifying the cellular signal C received by at least one of the shadow antennas 58 and for amplifying the transmitter signal T received by the LOS antenna 56. For example, as shown in FIG. 6, the amplifier section 62 is disposed between the LOS antenna 56 and the splitter 74. As shown in FIG. 7, a plurality of amplifier sections 62 is provided respectively disposed between the splitter 74 and the plurality of shadow antennas 58. Although only two shadow antennas 58 and two corresponding amplifier sections 62 are shown, there may be any number of shadow antenna 58 and corresponding number of amplifier sections 62.

Figure 8:
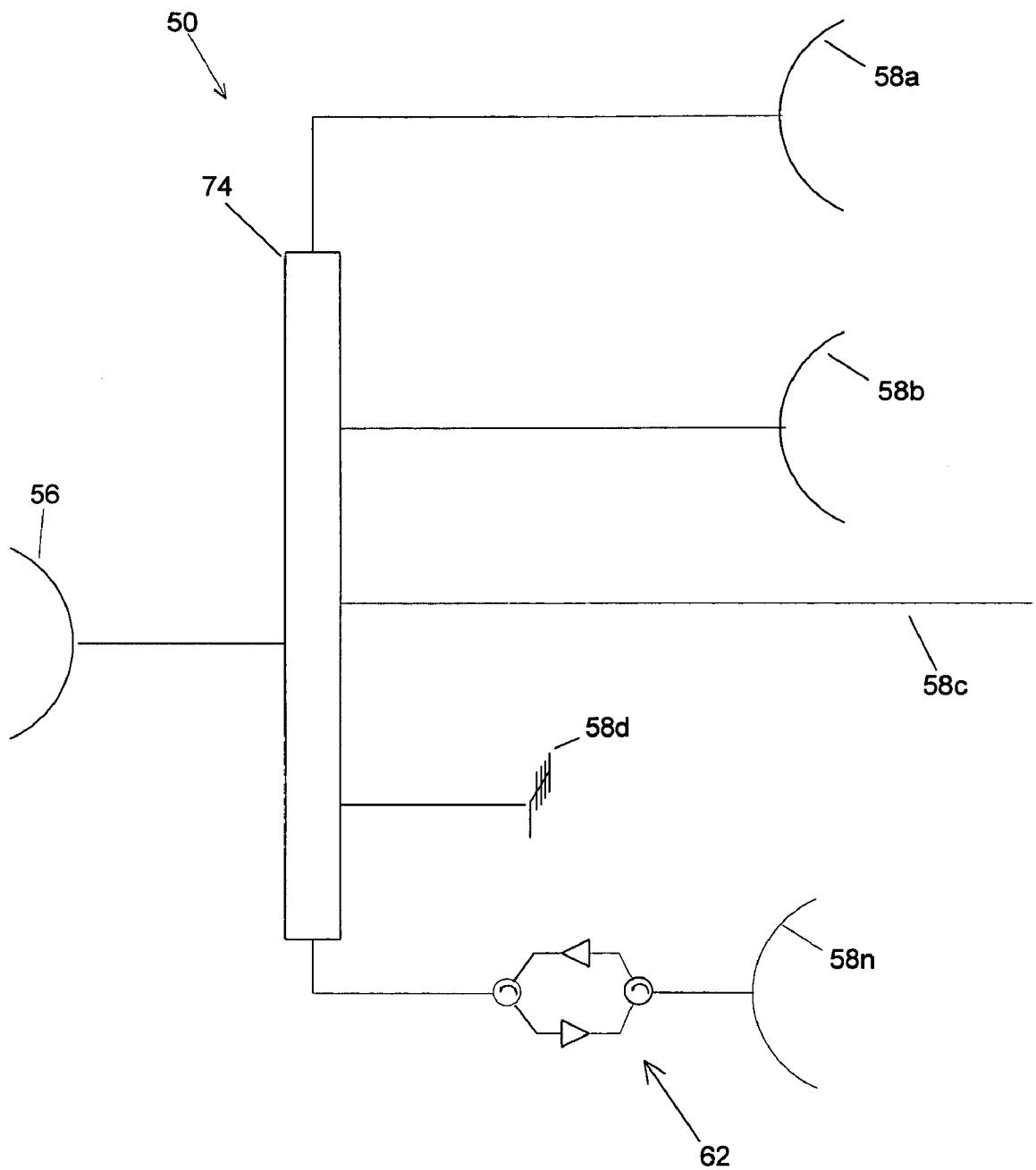
FIG. 8 is a schematic view illustrating an embodiment of the system with a plurality of different types of antennas.

In addition to the exterior installation represented in FIG. 1, the telecommunication system 50 may be configured for other types of installations, for example, in buildings, underground facilities, and other areas where an RF shadow exists that inhibits cellular service. For example, as shown in FIG. 8, the system 50 may include a plurality of shadow antennas 58 for transmitting the transmitter signal T and for receiving cellular signals C to respective areas of the RF shadow (or to respective RF shadows). More specifically, the plurality of shadow antennas 58 may include antennas of different types, for example, a radiating cable 58c and an aperture radiator 58d which are configured to operate within a particular configuration or area of the RF shadow.

Those skilled in the art will understand that the preceding exemplary embodiments of the present invention provide the foundation for numerous alternatives and modifications thereto. These other modifications are also within the scope of the present invention. Accordingly, the present invention is not limited to that precisely as shown and described in the present invention.

What is claimed is:

1. A telecommunications system for providing service to a cellular device located within a radio-frequency (RF) shadow of a communication station including a transmitter and a receiver, the system comprising:
   a line-of-sight (LOS) antenna for receiving a transmitter signal from the station;
   a plurality of shadow antennas each in communication with the LOS antenna, located within a line of sight of the RF shadow, and for receiving a cellular signal from the cellular device;
   a splitter disposed between the LOS antenna and each of the plurality of shadow antennas and for splitting the transmitter signal into a corresponding plurality of transmitter signals respectively communicated to the shadow antennas;
   the LOS antenna for receiving cellular signals from the shadow antennas and for transmitting the cellular signals to the station;
   each of the shadow antennas for receiving a respective one of the transmitter signals from the LOS antenna and transmitting the respective transmitter signal to the RF shadow; and
   a plurality of amplification sections respectively disposed between the shadow antennas and the splitter each for amplifying a respectively received transmitter signal and for amplifying the cellular signal received by a respective one of the shadow antennas.

2. The system of claim 1 wherein each of the amplification sections includes an LOS circulator and a shadow circulator defining an LOS-to-shadow path and a shadow-to-LOS path between the splitter and a respective one of the shadow antennas;
   the LOS circulator for:
      receiving the cellular signal from the shadow-to-LOS path;
      providing the cellular signal to the splitter;
      receiving the transmitter signal from the splitter; and
      providing the transmitter signal to the LOS-to-shadow path; and
   the shadow circulator for:
      receiving the transmitter signal from the LOS-to-shadow path;
      providing the transmitter signal to a respective one of the shadow antennas;
      receiving the cellular signal from a respective one of the shadow antennas; and
      providing the cellular signal to the shadow-to-LOS path.

* * * * *